(12) United States Patent
Yi et al.

(10) Patent No.: US 9,571,248 B2
(45) Date of Patent: Feb. 14, 2017

(54) METHOD AND APPARATUS FOR CONFIGURING A REFERENCE SIGNAL IN A WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/439,204

(22) PCT Filed: Oct. 29, 2013

(86) PCT No.: PCT/KR2013/009685
§ 371 (c)(1),
(2) Date: Apr. 28, 2015

(87) PCT Pub. No.: WO2014/069877
PCT Pub. Date: May 8, 2014

(65) Prior Publication Data
US 2015/0256312 A1    Sep. 10, 2015

Related U.S. Application Data

(60) Provisional application No. 61/719,502, filed on Oct. 29, 2012, provisional application No. 61/762,325, (Continued)

(51) Int. Cl.
*H04L 1/00* (2006.01)
*H04L 5/00* (2006.01)
(Continued)

(52) U.S. Cl.
CPC ........... *H04L 5/0048* (2013.01); *H04L 5/0073* (2013.01); *H04L 5/0082* (2013.01); *H04W 72/04* (2013.01);
(Continued)

(58) Field of Classification Search
CPC ........ H04J 11/00; H04J 13/004; H04J 5/0007; H04J 2011/0003; H04J 2011/0006; H04J 2011/0009; H04J 2011/0013; H04J 2011/0016; H06F 17/14; H06F 17/145; H06F 17/147
(Continued)

(56) References Cited

FOREIGN PATENT DOCUMENTS

EP    2 482 485 A1    8/2012

OTHER PUBLICATIONS

HTC, "Transmissions of PSS/SSS and DM-RS in Unsynchronised New Carriers", 3GPP TSG RAN WG1 Meeting #69, R1-122320, Prague, Czech Republic, May 21-25, 2012, pp. 1-4.
(Continued)

*Primary Examiner* — Dady Chery
(74) *Attorney, Agent, or Firm* — Birch, Stewart, Kolasch & Birch, LLP

(57) ABSTRACT

A method for and apparatus for configuring a reference signal (RS) in a wireless communication system supporting multiple carriers is provided. A wireless device configures a new RS subframe at a periodicity among other subframes not including the new RS, identifies the new RS in the subframe which is a different subframe from the other subframes for legacy RS signals, and performs at least one of frequency or timing tracking using the new RS, wherein a frequency density of the new RS in the subframe is located with at least 3 resource element each other. And, this invention includes that RS signals and controls for multi-CCs are provided more accurately and efficiently.

11 Claims, 15 Drawing Sheets

Related U.S. Application Data filed on Feb. 8, 2013, provisional application No. 61/764,998, filed on Feb. 14, 2013, provisional application No. 61/804,205, filed on Mar. 22, 2013, provisional application No. 61/761,244, filed on Feb. 6, 2013.

(51) Int. Cl.
*H04W 72/04* (2009.01)
*H04L 5/14* (2006.01)

(52) U.S. Cl.
CPC .............. *H04L 5/001* (2013.01); *H04L 5/0023* (2013.01); *H04L 5/14* (2013.01)

(58) Field of Classification Search
USPC ................................ 370/329, 203, 204, 208
See application file for complete search history.

(56) References Cited

OTHER PUBLICATIONS

Huawei, Hisilicon, "DM-RS patterns for additional carrier types", 3GPP TSG RAN WG1 Meeting #69, R1-122519, Prague, Czech Republic, May 21-25, 2012.

Intel Corporation, "Considerations on location of PSS/SSS signaling in NCT", 3GPP TSG RAN WG1 Meeting #69, R1-122658, Prague, Czech Republic, May 21-25, 2012.

LG Electronics, "Handling the Conflict of PSS/SSS and DM-RS in NCT", 3GPP TSG RAN WG1#69, R1-122275, Prague, Czech Republic, May 21-25, 2012.

Fig. 9

| | 0 | 1 | 2 | 3 | 4 | 5 | 6 | 0 | 1 | 2 | 3 | 4 | 5 | 6 |
|---|---|---|---|---|---|---|---|---|---|---|---|---|---|---|
| 11 | | | ▨ | ▨ | | | | | | 1-0 | 1-0 | | ▨ | ▨ |
| 10 | | | ▨ | ▨ | | | | | | 6-0<br>1-2 | 6-0<br>1-2 | | ▨ | ▨ |
| 9 | | | | | T-0 | 0-0 | 0-0 | | | 2-0 | 2-0 | T-0 | 4-0 | 4-0 |
| 8 | | | | | | 5-0<br>0-2 | 5-0<br>0-2 | | | 7-0<br>2-2 | 7-0<br>2-2 | | 9-0<br>4-2 | 9-0<br>4-2 |
| 7 | | | | | | | | | | 3-0 | 3-0 | | | |
| 6 | T-0 | | ▨ | ▨ | | | T-0 | | | 8-0<br>1-1<br>3-2 | 8-0<br>1-1<br>3-2 | | ▨ | ▨ |
| 5 | | | ▨ | ▨ | | | | | | 12-0<br>1-3 | 12-0<br>1-3 | | ▨ | ▨ |
| 4 | | | | | | | | | | 13-0<br>6-1 | 13-0<br>6-1 | | | |
| 3 | | | | | T-0 | 10-0<br>0-1 | 10-0<br>0-1 | | | 14-0<br>2-1 | 14-0<br>2-1 | T-0 | 19-0<br>4-1 | 19-0<br>4-1 |
| 2 | | | | | | 11-0<br>5-1<br>0-3 | 11-0<br>5-1<br>0-3 | | | 15-0<br>7-1<br>2-3 | 15-0<br>7-1<br>2-3 | | 20-0<br>9-1<br>4-3 | 20-0<br>9-1<br>4-3 |
| 1 | | | ▨ | ▨ | | | | | | 16-0<br>3-1 | 16-0<br>3-1 | | ▨ | ▨ |
| 0 | T-0 | | ▨ | ▨ | | | T-0 | | | 18-0<br>8-1<br>3-3 | 18-0<br>8-1<br>3-3 | | ▨ | ▨ |

Pattern 10-A

Pattern 10-B

Pattern 10-C

Pattern 10-D

Pattern 10-E

Pattern 10-F

Pattern 10-G

Fig. 11
| 11 | | | | 20-0 | | | | 20-0 | 1-0 | 1-0 | | | |
|---|---|---|---|---|---|---|---|---|---|---|---|---|---|
| 10 | | | | 23-0<br>20-2 | | | | 23-0<br>20-2 | 6-0<br>1-2 | 6-0<br>1-2 | | | |
| 9 | | | | 21-0 | T-0 | 0-0 | 0-0 | T-1 | 21-0 | 2-0 | 2-0 | T-0 | 4-0 | 4-0 |
| 8 | | | | 24-0<br>21-1 | | 5-0<br>0-2 | 5-0<br>0-2 | | 24-0<br>21-1 | 7-0<br>2-2 | 7-0<br>2-2 | | 9-0<br>4-2 | 9-0<br>4-2 |
| 7 | | | | 22-0 | | | | | 22-0 | 3-0 | 3-0 | | | |
| 6 | T-0 | | | 25-0<br>22-1 | | | | T-0 | 25-0<br>22-1 | 8-0<br>1-1<br>3-2 | 8-0<br>1-1<br>3-2 | | | |
| 5 | | | | 26-0<br>20-1 | | | | | 26-0<br>20-1 | 12-0<br>1-3 | 12-0<br>1-3 | | | |
| 4 | | | | 27-0<br>23-1<br>20-3 | | | | | 27-0<br>23-1<br>20-3 | 13-0<br>6-1 | 13-0<br>6-1 | | | |
| 3 | | | | | | | | | | | | | | |
| 2 | | | | 29-0<br>24-1<br>21-3 | | 11-0<br>5-1<br>0-3 | 11-0<br>5-1<br>0-3 | | 29-0<br>24-1<br>21-3 | 15-0<br>7-1<br>2-3 | 15-0<br>7-1<br>2-3 | | 20-0<br>9-1<br>4-3 | 20-0<br>9-1<br>4-3 |
| 1 | | | | 30-0<br>22-1 | | | | | 30-0<br>22-1 | 16-0<br>3-1 | 16-0<br>3-1 | | | |
| 0 | T-0 | | | 31-0<br>25-1<br>22-3 | | | | T-0 | 31-0<br>25-1<br>22-3 | 18-0<br>8-1<br>3-3 | 18-0<br>8-1<br>3-3 | | | |
| | 0 | 1 | 2 | 3 | 4 | 5 | 6 | 0 | 1 | 2 | 3 | 4 | 5 | 6 |
Fig. 12
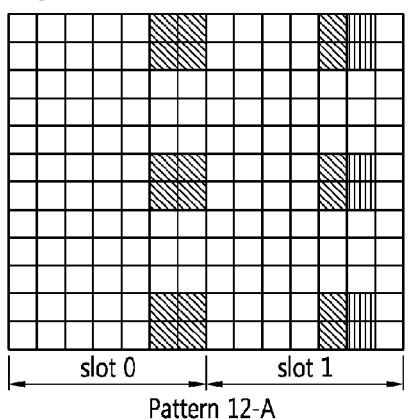
Pattern 12-A
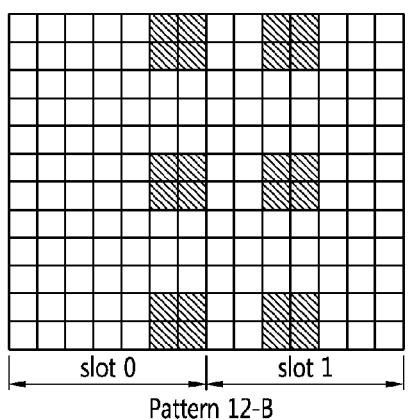
Pattern 12-B

Fig. 13

| | 0 | 1 | 2 | 3 | 4 | 5 | 0 | 1 | 2 | 3 | 4 | 5 |
|---|---|---|---|---|---|---|---|---|---|---|---|---|
| 11 | | | | | 0-0 | 0-0 | | | | | | |
| 10 | | | | | | | | | | | 2-0 | 2-0 |
| 9 | | | | T-0 | 1-0 | 1-0 | | | | T-0 | 3-0 | 3-0 |
| 8 | | | | | 8-0 0-1 | 8-0 0-1 | | | | | | |
| 7 | | | | | | | | | | | 12-0 2-1 | 12-0 2-1 |
| 6 | T-0 | | T-1 | | 9-0 1-1 | 9-0 1-1 | T-0 | | T-1 | | 13-0 3-1 | 13-0 3-1 |
| 5 | | | | | 4-0 0-2 | 4-0 0-2 | | | | | | |
| 4 | | | | | | | | | | | 6-0 2-2 | 6-0 2-2 |
| 3 | | | | T-0 | 5-0 1-2 | 5-0 1-2 | | | | T-0 | 7-0 3-2 | 7-0 3-2 |
| 2 | | | | | 10-0 4-1 0-3 | 10-0 4-1 0-3 | | | | | | |
| 1 | | | | | | | | | | | 14-0 6-1 2-3 | 14-0 6-1 2-3 |
| 0 | T-0 | | | T-1 | 11-0 5-1 1-3 | 11-0 5-1 1-3 | T-0 | | | T-1 | 15-0 7-1 3-3 | 15-0 7-1 3-3 |

Fig. 14

| | 0 | 1 | 2 | 3 | 4 | 5 | 0 | 1 | 2 | 3 | 4 | 5 |
|---|---|---|---|---|---|---|---|---|---|---|---|---|
| 11 | | | | | 0-0 | 0-0 | | | | | ▨ | ▨ |
| 10 | | | ▨ | ▨ | | | | | | | 2-0 | 2-0 |
| 9 | | | T-0 | | 1-0 | 1-0 | | | T-0 | | 3-0 | 3-0 |
| 8 | | | | | 8-0<br>0-1 | 8-0<br>0-1 | | | | | ▨ | ▨ |
| 7 | | | ▨ | ▨ | | | | | | | 12-0<br>2-1 | 12-0<br>2-1 |
| 6 | T-0 | | T-1 | | 9-0<br>1-1 | 9-0<br>1-1 | T-0 | | T-1 | | 13-0<br>3-1 | 13-0<br>3-1 |
| 5 | | | | | 4-0<br>0-2 | 4-0<br>0-2 | | | | | ▨ | ▨ |
| 4 | | | ▨ | ▨ | | | | | | | 6-0<br>2-2 | 6-0<br>2-2 |
| 3 | | | T-0 | | 5-0<br>1-2 | 5-0<br>1-2 | | | T-0 | | 7-0<br>3-2 | 7-0<br>3-2 |
| 2 | | | | | 10-0<br>4-1<br>0-3 | 10-0<br>4-1<br>0-3 | | | | | ▨ | ▨ |
| 1 | | | ▨ | ▨ | | | | | | | 14-0<br>6-1<br>2-3 | 14-0<br>6-1<br>2-3 |
| 0 | T-0 | | | T-1 | 11-0<br>5-1<br>1-3 | 11-0<br>5-1<br>1-3 | T-0 | | | T-1 | 15-0<br>7-1<br>3-3 | 15-0<br>7-1<br>3-3 |

Fig. 15

| | 0 | 1 | 2 | 3 | 4 | 5 | 0 | 1 | 2 | 3 | 4 | 5 |
|---|---|---|---|---|---|---|---|---|---|---|---|---|
| 11 | | | | | 0-0 | 0-0 | | 16-0 | 16-0 | ▨ | ▨ | ▒ |
| 10 | | | | ▨ | | | | 17-0 | 17-0 | | 2-0 | 2-0 |
| 9 | | | | T-0 | 1-0 | 1-0 | | 18-0 | 18-0 | T-0 | 3-0 | 3-0 |
| 8 | | | | | 8-0<br>0-1 | 8-0<br>0-1 | | 22-0<br>16-1 | 22-0<br>16-1 | ▨ | | ▒ |
| 7 | | | | ▨ | | | | 23-0<br>17-1 | 23-0<br>17-1 | | 12-0<br>2-1 | 12-0<br>2-1 |
| 6 | T-0 | | | T-1 | 9-0<br>1-1 | 9-0<br>1-1 | T-0 | 24-0<br>18-1 | 24-0<br>18-1 | T-1 | 13-0<br>3-1 | 13-0<br>3-1 |
| 5 | | | | | 4-0<br>0-2 | 4-0<br>0-2 | | 19-0<br>16-2 | 19-0<br>16-2 | ▨ | | ▒ |
| 4 | | | | ▨ | | | | 20-0<br>17-2 | 20-0<br>17-2 | | 6-0<br>2-2 | 6-0<br>2-2 |
| 3 | | | | T-0 | 5-0<br>1-2 | 5-0<br>1-2 | | 21-0<br>18-2 | 21-0<br>18-2 | T-0 | 7-0<br>3-2 | 7-0<br>3-2 |
| 2 | | | | | 10-0<br>4-1<br>0-3 | 10-0<br>4-1<br>0-3 | | 25-0<br>19-1<br>16-3 | 25-0<br>19-1<br>16-3 | ▨ | | ▒ |
| 1 | | | | ▨ | | | | 26-0<br>20-1<br>17-3 | 26-0<br>20-1<br>17-3 | | 14-0<br>6-1<br>2-3 | 14-0<br>6-1<br>2-3 |
| 0 | T-0 | | | T-1 | 11-0<br>5-1<br>1-3 | 11-0<br>5-1<br>1-3 | T-0 | 27-0<br>21-1<br>18-3 | 27-0<br>21-1<br>18-3 | T-1 | 15-0<br>7-1<br>3-3 | 15-0<br>7-1<br>3-3 |

Pattern 16-A

Pattern 16-B

Pattern 16-C

Pattern 16-D

Pattern 16-E

Pattern 16-F

Pattern 16-G

Pattern 16-H

METHOD AND APPARATUS FOR
CONFIGURING A REFERENCE SIGNAL IN A
WIRELESS COMMUNICATION SYSTEM

CROSS REFERENCE TO RELATED
APPLICATIONS

This application is the National Phase of PCT International Application No. PCT/KR2013/009685, filed on Oct. 29, 2013, which claims priority under 35 U.S.C. 119(e) to U.S. Provisional Application Nos. 61/719,502, filed on Oct. 29, 2012, 61/762,325, filed on Feb. 8, 2013, 61/764,998, filed on Feb. 14, 2013, 61/804,205, filed on Mar. 22, 2013, and 61/761,244 filed on Feb. 6, 2013, all of which are hereby expressly incorporated by reference into the present application.

TECHNICAL FIELD

The present invention relates to wireless communications, and more particularly, to a method and apparatus for configuring a reference signal in a wireless communication system.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The ccommercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and an User equipment as a Terminal. Also various reference signals are required to transmit between the eNB and the UE to support inter-cell interference reduction and carrier extensions. An efficient configuration and allocation scheme for a reference signal to be added newly is needed.

DISCLOSURE OF INVENTION

Technical Problem

The present invention provides a method and apparatus for configuring a reference signal in a wireless communication system.

The present invention also provides a method and apparatus for allocating locations for a reference signal in different subframes from subframes for legacy reference signals in a wireless communication system.

Solution to Problem

In an aspect, a method for configuring a reference signal (RS) in a wireless communication system supporting multiple carriers is provided. The method may include configuring to receive a new RS subframe at a periodicity among other subframes not including the new RS, identifying the new RS in the subframe which is a different subframe from the other subframes for legacy RS signals, and performing at least one of frequency or timing tracking, cell identification, and measurement using the new RS, wherein a frequency density of the new RS in the subframe is located with at least 3 resource element each other.

The method may further include determining whether the legacy RS signals each is absent in one or more downlink subframes, wherein the identifying comprises determining candidate allocations with orthogonal frequency division multiplexing (OFDM) symbols or sub-carriers for the new RS not to collide with the legacy RS signals which are allocated in the one or more downlink subframes.

In another aspect, a wireless device for allocating a reference signal (RS) in a wireless communication system supporting multiple carriers is provided. The wireless device includes a radio frequency unit for receiving a radio signal; and a processor, operatively coupled with the radio frequency unit, configured to configure to receive a new RS subframe at a periodicity among other subframes not including the new RS, identify the new RS in the subframe which is a different subframe from the other subframes for legacy RS signals, and perform at least one of frequency or timing tracking, cell identification, and measurement using the new RS, wherein a frequency density of the new RS in the subframe is located with at least 3 resource element each other.

Advantageous Effects of Invention

This invention provides an efficient RS transmission including legacy RS signals and a new RS signal in locations with different subframes. More details, this invention provides the new RS signal and legacy RS signals structure of both normal CP case and Extended CP case, the new RS signals can be transmitted in valid locations to satisfy to transmit the legacy RS signals. UEs in a different subframe in a cell are distinguished orthogonally by different RS signals of the basis sequence assigned to different UEs UE. Therefore, efficient legacy RS signals and the RS signal added newly in a cell are transmitted in this invention.

BRIEF DESCRIPTION OF DRAWINGS

FIG. 8 to FIG. 12 show exemplary candidate locations of new RS according to an exemplary embodiment of the present invention.

FIG. 13 and FIG. 16 show exemplary candidate locations of new RS for Extended CP according to an exemplary embodiment of the present invention.

MODE FOR THE INVENTION

Figure 1:
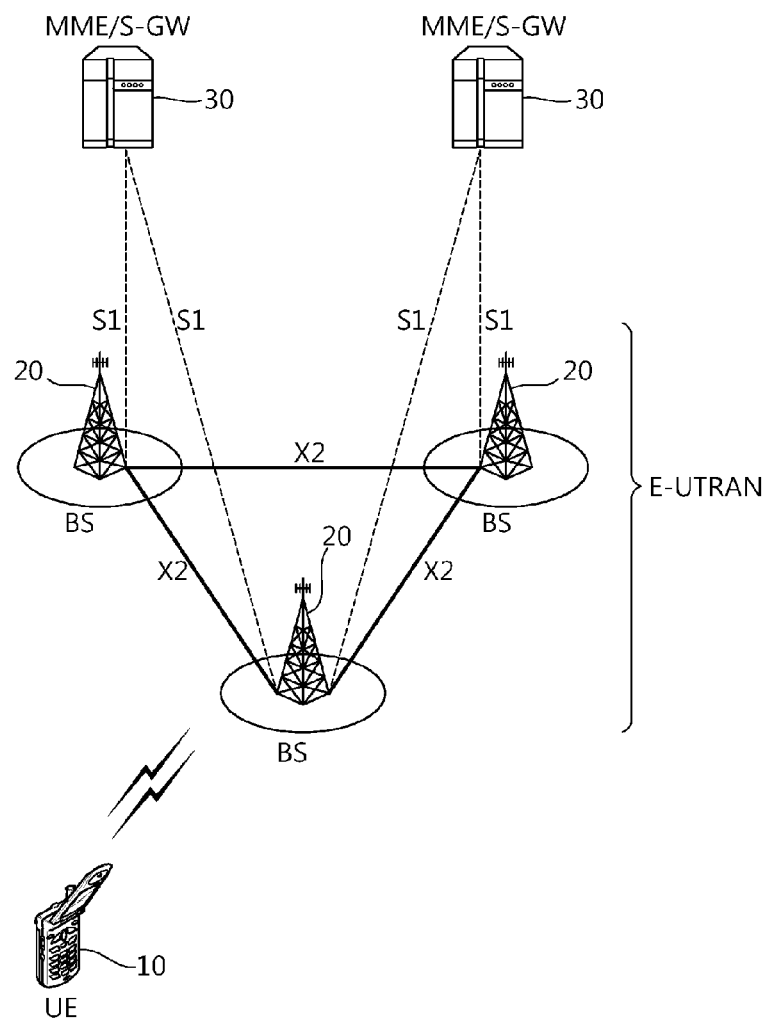
FIG. 1 is view illustrating a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

Referring to FIG. 1, E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
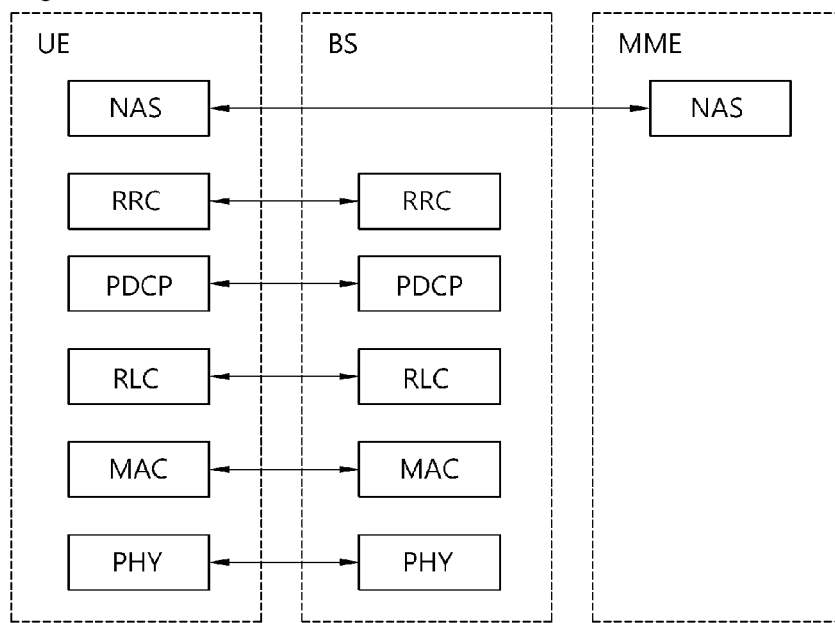
FIG. 2 is a view illustrating an example of a protocol structure to which the present invention is applied.

FIG. 2 is a diagram showing a radio protocol architecture for a user plane(U-plane) and a control plane(C-plane). The user plane is a protocol stack for user data transmission. The control plane is a protocol stack for control signal transmission with RRC and NAS layers.

Referring to FIG. 2, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH) or optionally added an Enhanced PDCCH (EPDDCH), i.e., an L1/L2 control channel.

Figure 3:
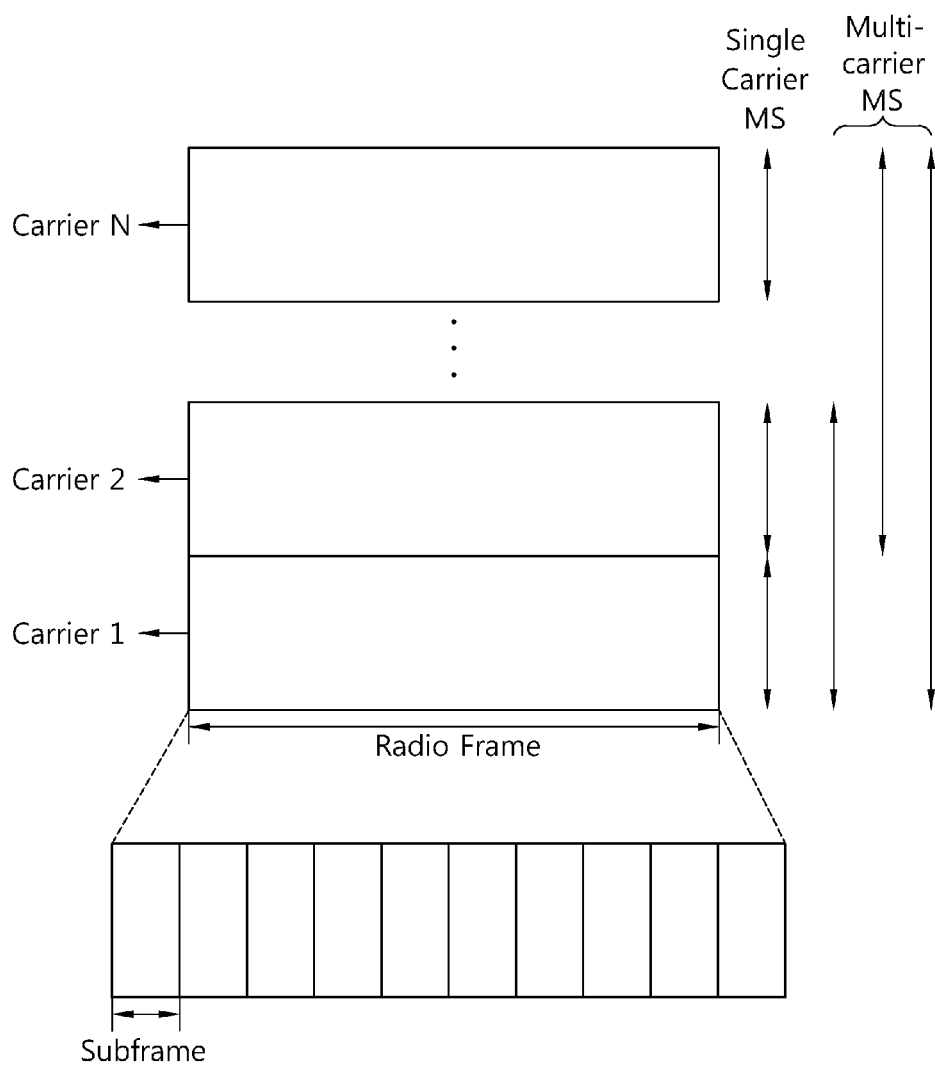
FIG. 3 is a view illustrating an example of a frame structure for a multi-carrier operation to which the present invention is applied.

FIG. 3 is a view illustrating an example of a frame structure for a multi-carrier operation to which the present invention is applied. This invention can be also applied that the aggregated CCs are not aligned at subframe as synchronization.

Referring to FIG. 3, a UE may support one or more carriers (Carrier 1 or more Carriers 2 . . . N) according to UE's capability thereof. Multiple carriers may be adjacent to each other or may not.

Component carriers may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

Meanwhile, there is a need of a new carrier type for an efficient cell planning since the Pcell is completely saturated with transmitting and receiving control signals and reference signals between eNB and UE, also the Pcell needs more resources to control the UE with one more Scells for CA. the new carrier is expected to signal less control signals and reference signals between eNB and UE and also the discussion is needed how control signals and reference signals are sent the between eNB and UE to optimize the cell operation.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left., which are the remaining indices other than 0, i.e., the index of the Pcell. Herein, the index of the serving cell may be a logical index determined relatively for each UE, or may be a physical index for indicating a cell of a specific frequency band.

Figure 4:
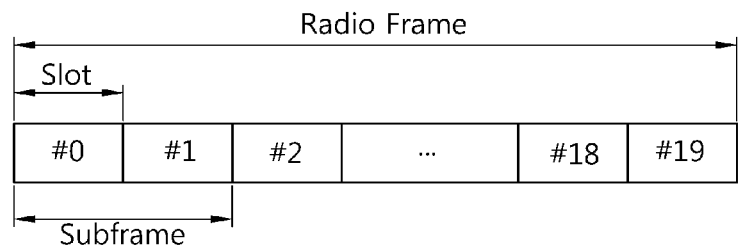
FIG. 4 shows the structure of a radio frame to which the present invention is applied.

FIG. 4 shows the structure of a radio frame to which the present invention is applied.

Referring to FIG. 4, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot.

The structure of the radio frame is only illustrative, and the number of subframes included in a radio frame or the number of slots included in a subframe and the number of OFDM symbols included in a slot may be changed in various ways.

In relation to resource allocation, a physical resource structure is first described.

Figure 5:
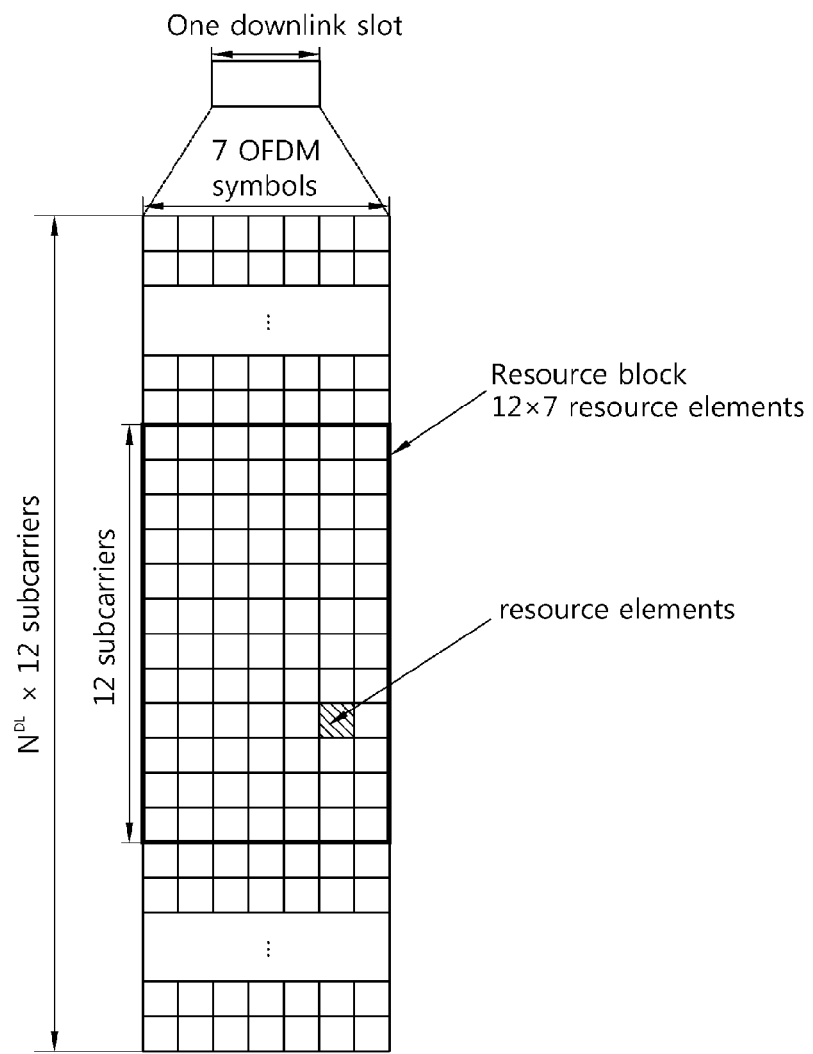
FIG. 5 is an exemplary diagram showing a resource grid for one downlink slot to which the present invention is applied.

FIG. 5 is an exemplary diagram showing a resource grid for one downlink slot to which the present invention is applied.

Referring to FIG. 5, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
| --- | --- | --- | --- |
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 6:
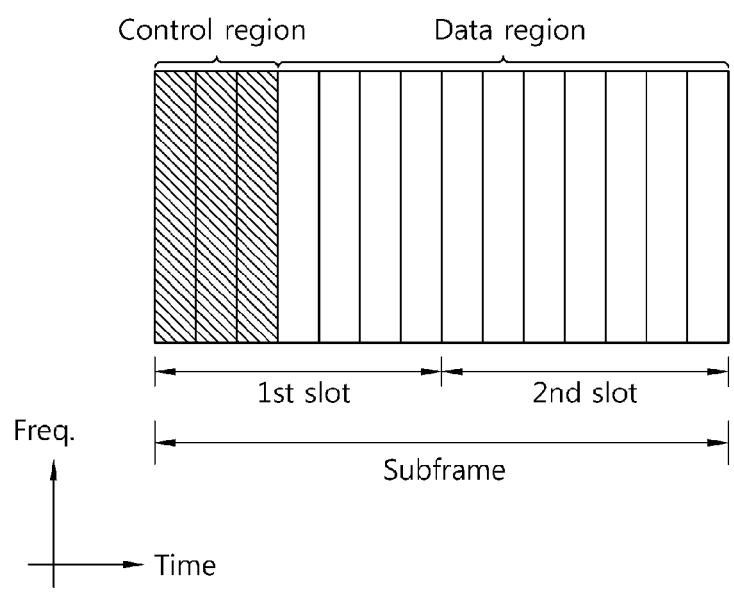
FIG. 6 shows the structure of a downlink subframe to which the present invention is applied.

FIG. 6 shows the structure of a downlink subframe to which the present invention is applied.

Referring to FIG. 6, a subframe includes two slots. The former 0 or 1 or 2 or 3 OFDM symbols of the first slot within the subframe correspond to a control region to which a PDCCH is allocated, and the remaining OFDM symbols thereof become a data region to which a PDSCH is allocated. When 0 OFDM symbols of the first slot within the subframe is used for control region, an enhanced PDCCH (EPDCCH) can be placed in data region which conveys control information.

Downlink control channels include a Physical Control Format Indicator Channel (PCFICH), a Physical Downlink Control Channel (PDCCH)/EPDCCH, and a Physical Hybrid-ARQ Indicator Channel (PHICH)/EPHICH.

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH/EPDCCH.

The PHICH/EPHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH/EPDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCH/EPDCCHs may be transmitted within the control region, and a UE can monitor a plurality of PDCCH/EPDCCHs. PDCCH/EPDCCHs are transmitted on one Control Channel Element (CCE)/ECCE or on an aggregation of some contiguous CCE/ECCEs. A CCE (ECCE) is a logical assignment unit for providing a coding rate according to the state of a radio channel to a PDCCH/EPDCCH. A CCE/ECCE corresponds to a plurality of resource element groups (REGs). The format of a PDCCH/EPDCCH and the number of possible bits of a PDCCH/EPDCCH are determined by a correlation between the number of CCE(ECCE)s and a coding rate provided by CCE(ECCE)s.

Control information transmitted through a PDCCH/EPDCCH is called Downlink Control Information (hereinafter referred to as DCI). The DCI includes uplink or downlink scheduling information or includes an uplink transmit (Tx) power control command for arbitrary UE groups. The DCI is differently used depending on its format, and it also has a different field that is defined within the DCI. Table 2 shows DCI according to a DCI format.

TABLE 2

| DCI format | Description |
| --- | --- |
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |

TABLE 2-continued

| DCI format | Description |
|---|---|
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

Table 3 shows the DCI of Format 0, that is, uplink resource allocation information (or an uplink grant).

The flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

For example, in Table 3, if the resource allocation field has 13 bits in a band of an FDD 20 MHz, an uplink grant has a total of 27 bits (except a CIF field and a CRC field). If the length of bits determined as the input of blind decoding is 28 bits, a BS makes the uplink grant the total number of 28 bits by adding the redundant bits of 1 bit to the uplink grant at the time of scheduling. Here, all the redundant bits may be set to 0 because they do not include special information. Of course, the number of redundant bits may be smaller than or greater than 2.

The wireless communication system as 3GPP LTE of the present invention uses blind decoding for PDCCH/EPDCCH detection. The blind decoding is a scheme in which a desired identifier is de-masked from a CRC of a PDCCH/EPDCCH (referred to as a candidate PDCCH/EPDCCH) to determine whether the PDCCH/EPDCCH is its own channel by performing CRC error checking.

TABLE 3

Carrier indicator-0 or 3 bits
Flag for identifying Format 0/Format 1A-1 bit, 0 indicates Format 0, 1 indicates Format 1A.
Frequency hopping flag-1 bit, is a Most Significant Bit (MSB) corresponding to resource allocation at need and used to assign multiple clusters.
Resource block assignment and hopping resource allocation-$\lceil \log_2(N_{RB}^{UL}(N_{RB}^{UL} + 1)/2) \rceil$ bits
  PUSCH hopping (corresponding to only single cluster assignment):
  $N_{UL\_hop}$ MSBs are used to obtain an $n_{PRB}(i)$ value.
  $(\lceil \log_2(N_{RB}^{UL}(N_{RB}^{UL} + 1)/2) \rceil - N_{UL\_hop})$ bits provide the resource allocation of the first slot of an uplink subframe.
  In single cluster assignment, non-hopping PUSCH
  $(\lceil \log_2(N_{RB}^{UL}(N_{RB}^{UL} + 1)/2) \rceil)$ bits provide the resource allocation of an uplink subframe.
  In multi-cluster assignment, non-hopping PUSCH: Resource assignment is obtained from a combination of a frequency hopping flag field and a resource block assignment and hopping resource allocation field.

$$\left\lceil \log_2\left(\binom{\lceil N_{RB}^{UL}/p + 1 \rceil}{4}\right)\right\rceil$$ bits provide resource allocation in an uplink subframe.

Wherein, P depends on the number of downlink resource blocks.
Modulation and coding scheme/redundancy version-5 bits
New data indicator-1 bit
TPC command for a scheduled PUSCH-2 bits
Cyclic shift and OCC index for DM RS-3 bits
Uplink index-2 bits, only exist for a TDD operation, that is, an uplink-downlink configuration 0
Downlink Assignment Index (DAI)-2 bits, only exist for TDD operations, that is, uplink-downlink configurations 1-6
CQI request-1 or 2 bits, a 2 bit field is applied to a UE configured using at least one downlink cell.
SRS request-0 or 1 bit.
Multi-cluster flag-1 bit.

An eNB determines a PDCCH/EPDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH/EPDCCH.

Figure 7:
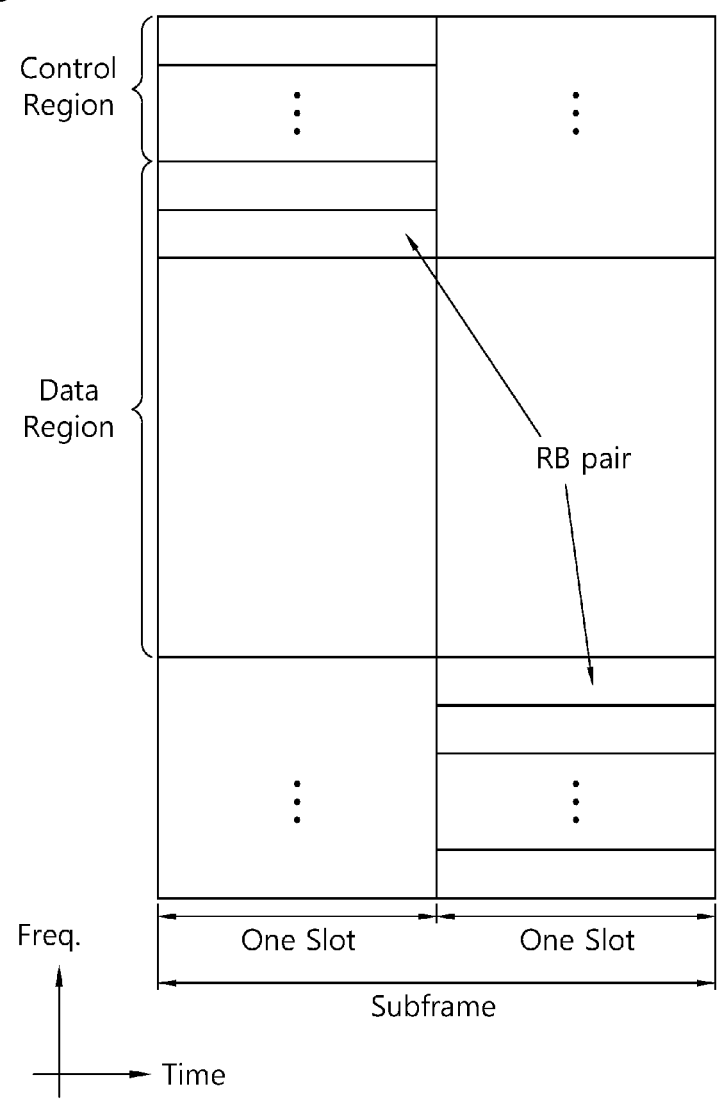
FIG. 7 shows the structure of an uplink subframe carrying an ACK/NACK signal to which the present invention is applied.

FIG. 7 is a view illustrating an example of a structure of an uplink subframe carrying an ACK/NACK signal to which the present invention is applied.

Referring to FIG. 7, an uplink subframe may be divided into a control region to which a physical uplink control channel (PUCCH) that carries uplink control information is allocated, herein; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

In systems, CRS and control channels, such as PCFICHs/PDCCHs/PHICHs over some OFDM symbol(s) of the former part, are transmitted through all DL subframes (i.e., an SF) for a specific carrier other than a DL subframe configured for a special purpose (e.g., an MBSFN. Accordingly, backward compatibility for access by existing UE and for providing service to existing UE can be guaranteed. In contrast, in the next system, a new form of a carrier may be introduced in which all or some of the proposed backward compatible legacy signals/channels are not transmitted for reasons of the improvement of an interference problem between a plurality of cells, the enhancement of carrier extensibility, and an increase in the degree of freedom in providing advanced features (e.g., 8Tx MIMO).

In the present invention includes that a carrier is defined as a cell with new carrier form. A new carrier form can be defined as a carrier which may not allow Rel-11 and below UE to access or get service on it. In other words, a new carrier can be defined as a carrier which provides full functionality to Rel-12 and beyond compatible UEs. Since, it does not have to support backward compatibility to Rel-11 and below UEs, In an new cell with an optimized type to transmit a Reference Signal(RS) or control channels, DL resources can be efficiently used by improving the performance of DL reception and minimizing RS overhead through the reception of DM-RS-based DL data transmitted in a UE-specific way (i.e., precoded) and the measurement of a channel status based on a configurable CSI-RS having relatively low density, instead of omitting or significantly reducing fixed CRS transmission having high density (i.e., the reception of DL data and the measurement of a channel status dependent on the CRS transmission) basically. Removing or reducing fixed CRS transmission can be performed at a subframe level where dynamically a subframe may carry CRS or not. Or, it can be performed at semi-static level where a pattern can be defined per subframe to carry CRS or not. According to a pattern, each subframe may carry CRS or not. Alternatively, it can be performed at rather long-term time scale where a cell can perform on and off. When the cell is on state, it may transmit CRS and other necessary control/data channels. When the cell is in off state, it may transmit very minimal RS and discovery signals which can be used to assist UE to discover and perform measurement.

Accordingly, a method of performing DL data scheduling using an new cell may be taken into consideration by managing legacy RSs, that is, configured as the DL Transmission Mode (TM) of UE to which an new carrier has been allocated, in particular, only TMs (e.g., TM mode 8 or 9) based on a DM-RS, from among the above-defined DL TMs. Also, synchronization/tracking and various types of measurement may need to be performed on a new carrier for efficient. To this end, a scheme for configuring a Cell-specific RS (CRS) so that the CRS is partially (e.g., through one specific antenna port) transmitted on a Primary SS (PSS)/Secondary SS (SSS) having the same structure as or a different structure from those of existing LTE Rel-8/9/10 (e.g., relative order between Synchronization Signals (SSs) and the locations of OFDM symbols in which SSs are transmitted) and/or on the time (k (e.g., k=1) subframe intervals having a specific cycle) and frequency (a region corresponding to specific n (e.g., n=6) RBs (pairs)) may be taken into consideration. A CRS mainly is possible to transmit for synchronization or tracking, and not to be used as a control channel and an RS for DL data demodulation.

Hereinafter, DL reference signals are defined below, Cell-specific reference signals (CRS), MBSFN reference signals, UE-specific reference signals (DM-RS), Positioning reference signals (PRS), CSI reference signals (CSI-RS). There is one reference signal transmitted per downlink antenna port.

Cell-specific reference signals shall be transmitted in all downlink subframes in a cell supporting PDCCH transmission. In a new carrier, CRS can be omitted in downlink subframes without PDCCH transmission. Still, PDSCH can be scheduled via EPDCCH. Cell-specific reference signals are transmitted on one or several of antenna ports 0 to 3. Cell-specific reference signals are defined for $\Delta f=15$ kHZ only.

MBSFN reference signals shall be transmitted in the MBSFN region of MBSFN subframes only when the PMCH is transmitted. MBSFN reference signals are transmitted on antenna port 4. MBSFN reference signals are defined for extended cyclic prefix only.

UE-specific reference signals are supported for transmission of PDSCH and are transmitted on antenna port(s) p=5, p=7, p=8 or p=7, 8, . . . , v+6, where v is the number of layers used for transmission of the PDSCH. UE-specific reference signals are present and are a valid reference for PDSCH demodulation only if the PDSCH transmission is associated with the corresponding antenna port. UE-specific reference signals are transmitted only on the resource blocks upon which the corresponding PDSCH is mapped. The UE-specific reference signal is not transmitted in resource elements (k, l) in which one of the physical channels or physical signals other than UE-specific reference signal are transmitted using resource elements with the same index pair (k, l) regardless of their antenna port p.

Positioning reference signals shall only be transmitted in resource blocks in downlink subframes configured for positioning reference signal transmission. If both normal and MBSFN subframes are configured as positioning subframes within a cell, the OFDM symbols in a MBSFN subframe configured for positioning reference signal transmission shall use the same cyclic prefix as used for subframe #0. If only MBSFN subframes are configured as positioning subframes within a cell, the OFDM symbols configured for positioning reference signals in the MBSFN region of these subframes shall use extended cyclic prefix length. In a subframe configured for positioning reference signal transmission, the starting positions of the OFDM symbols configured for positioning reference signal transmission shall be identical to those in a subframe in which all OFDM symbols have the same cyclic prefix length as the OFDM symbols configured for positioning reference signal transmission.

Positioning reference signals are transmitted on antenna port 6. The positioning reference signals shall not be mapped to resource elements (k, l) allocated to PBCH, PSS or SSS regardless of their antenna port p.Positioning reference signals are defined for Δf=15 kHZ only.

CSI reference signals are transmitted on one, two, four or eight antenna ports using p=15, p=15, 16, p=15, . . . , 18 and p=15, . . . 22, respectively. CSI reference signals are defined for Δf=15 kHZ only.

For data demodulation and channel estimation for more efficient communication system, it may be needed that additional reference signal (User-specific) is transmitted. For that, demodulation-RS (DM-RS) specified in LTE specification without changing the sequence may be utilized. This invention discusses a few options of locations for a new demodulation-RS as a new RS signal. In addition, it may include new TDD/FDD configurations for the new RS signal which are optimized for a small cell and/or asymmetric downlink and uplink configuration in the system.

As described, the communication system can be applied the FDD and TDD. According to the FDD scheme, taking different frequency bands for uplink and downlink transmission is done. Occupy the same frequency band uplink and downlink transmission is done at different times, while according to the TDD approach. The channel impulse response of the TDD approach substantially reciprocal. A given uplink channel and downlink channel response in the frequency domain response is almost the same. Therefore, in a wireless communication system based on the TDD, the downlink channel response can be obtained from the uplink channel response. TDD The entire frequency band of the TDD approach because the time-sharing of the uplink and downlink transmission the uplink downlink transmission by the base station and the UE cannot be performed at the same time. TDD system, uplink and downlink transmission are separated by a unit sub-frame, the uplink and downlink transmission is carried out in the different sub-frames. Also the system can be used variable cyclic prefix (CP)s, Normal CP, one slot includes seven OFDM symbols, and an Extended CP, one slot is defined to include six OFDM symbols are.

Figure 8:
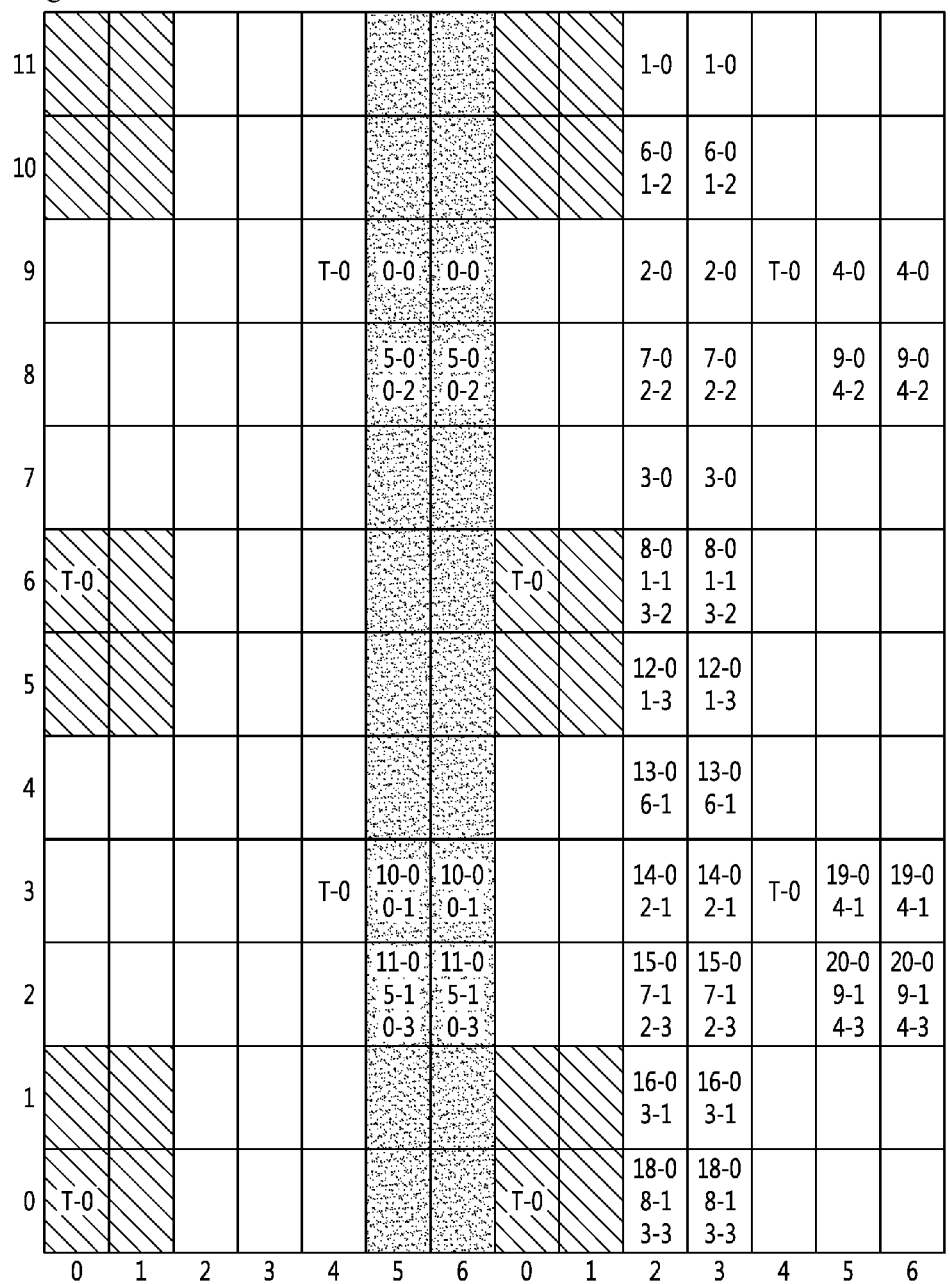

FIG. 8 shows an exemplary candidate location of RS added newly according to an exemplary embodiment of the present invention. This newly added RS can be used for data demodulation. In this case, DM-RS following Rel-11 and below specification will be omitted. This newly added RS can be used for cell discovery and measurement as well. In this case, DM-RS following Rel-11 and below specification will be still transmitted if data transmission is occurred. If this newly added RS is used for cell discovery and measurement, the RS will be transmitted cell-specific manner where the frequency (how often) and resources (e.g., sub-carriers) can be configured by higher layer. In this case, sequence generation of newly added RS could be different from Rel-11 DM-RS to be cell-specific. Also, since discovery signal can be transmitted rather sporadically, the sequence generation can be performed based on SFN rather than subframe or slot index. One example is shown is as follows. Herein, the newly added RS is called to a new RS as an example term for describing in this invention. The new RS can be called with a different term, but different term each also includes same meaning for variable examples for this invention.

The new RS can be generated with following equation 1 as an example.

$$c_{init}=(\lfloor SFN \rfloor+1) \cdot (2N_{ID}^{cell}+1) \cdot 2^{16}+n_{SCID} \qquad \text{<equation 1>}$$

where, the $n_{SCID}$>2, for example 3.

Referring to FIG. 8, UE-specific reference signal added newly may be considered to avoid collision with CSI-RS, synchronization signal as PSS/SSS, and TRS to set available locations. With keeping the same density to Rel-11 DM-RS, the candidate location of newly added RS without collision with signals specified in Rel-11 specification may not be easily achievable. Referring to FIG. 8, an example is shown where newly added RS location may collide with tracking RS or CRS. More details, a conflict with CSI-RS resources should be considered and avoided to allocate a RS newly added, since a new carrier measurement such as a RRM measurement and CSI will be mainly based on CSI-RS due to the lack of CRS. That is, a configured CSI-RS can be used for timing tracking, frequency tracking as well as CSI measurement and reference signal received power (RSRP) measurement, so it would be necessary to avoid the conflict between the new RS and legacy CSI-RS. The new RS can be DM-RS as an example. Also a conflict with TRS should be considered to allocate a RS newly added. In one example of a fixed configuration, the TRS subframe can be subframe 0 and subframe 5 of every frame (e.g., 5 ms periodicity), as illustrated in FIG. 8, or subframe 0 of every frame (e.g., 10 ms periodicity). FIG. 8 illustrates a 5 ms periodicity of TRS transmissions where the TRS is transmitted in one OFDM symbol of a subframe (e.g., the first OFDM symbol of a subframe). That is, when TRS is transmitted, the new DM-RS will not collide with the TRS. Lastly, a conflict with PSS/SSS should be considered to allocate a RS newly added, since the PSS/SSS appears in the slots 0 and 10 in subframes 0 and 5 within each frame. The PSS is in symbol 6 and the SSS is in symbol 5 within slot 0 and slot 10. Depending on the presence of PSS/SSS, it would be desirable to avoid the conflict with the PSS/SSS as well. If a CRS can be transmitted in a subframe carrying a Physical Downlink Control Channel (PDCCH) or a cell is considered as active, the new RS is transmitted in a subframe different from the other subframes for CRS or a active cell.

Therefore, this invention shows an example of feasible new RS location in FDD with normal CP. Herein, the new RS can be called to a new DM_RS for an example term. But the new DM_RS is not limited for the invention. In the FIG. 8, T-0 indicates the location of tracking RS and CSI-RS configuration index and the column index (0 for 2 CSI-RS ports, 1 for 4 and 2 for 8 CSI-RS antenna ports respectively) are shown as 0-0 type. OFDM symbols used for PSS/SSS are located in 5, 6 OFDM symbols. Therefore, available locations of new DM-RS for FDD/Normal CP would be 0, 1, 2, 3, 4 OFDM symbols in first slot and 0, 1, 4 OFDM symbols in second slot. Considering uniform distribution of new DM-RS REs, the candidate location would be 0, 1 OFDM symbols in each slot, or 0, 4 OFDM symbols in each slot, or 1, 4 OFDM symbols in each slot.

For all candidate locations, it is likely that DM-RS may collide with tracking RS if Vshift is used. Thus, Vshift should not be used and the location of tracking RS should be fixed such that it does not collide with DM-RS in the same OFDM symbol. To do this, one approach is to fix tracking RS position by selecting a fixed Vshift value so that tracking RS does not come in 0, 1, 5, 6, 10, 11 subcarrier in each RB or may change the location of DM-RS so that it does not collide with tracking RS (e.g., moving a few subcarriers up or down). To keep the uniform distribution of new DM-RS, it is desirable to fix the Vshift of tracking RS to a fixed value such as 2.

Another example is shown in FIG. 9, where new DM-RS comes in OFDM symbol 2, 3 OFDM symbols in first slot and 5, 6 OFDM symbols in second slot. These available locations of new DM-RS avoid the collision with PSS/SSS/TRS and CSI-RS as described FIG. 8, herein, the 5, 6 OFDM symbols are used for PSS/SSS. Given that the least collision probability with Rel-11 specified signals, a newly added RS pattern referring to FIG. 9 is desirable to be used for data demodulation in a new carrier. If this newly added RS is used for discovery signals, discovery signal may collide with Rel-11 DM-RS. In this case, a UE may assume that discovery signal has higher priority and thus DM-RS will be punctured or not transmitted. However, discovery signals along with additional pair DM-RS can be used for data demodulation.

Figure 10:
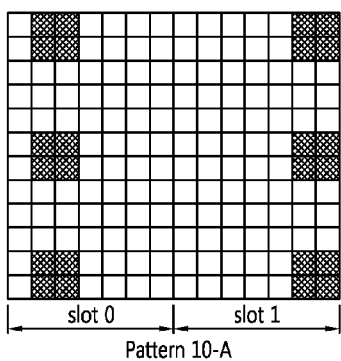
Figure 10:
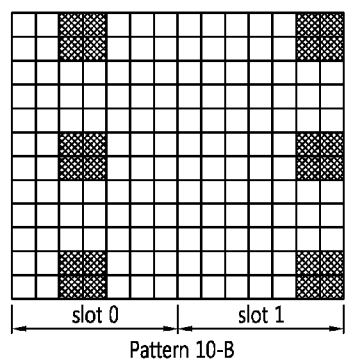
Figure 10:
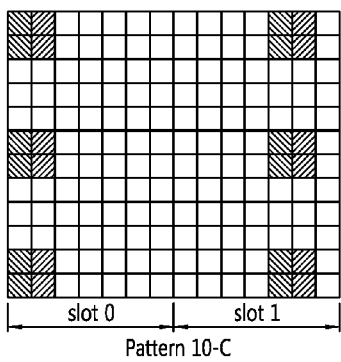
Figure 10:
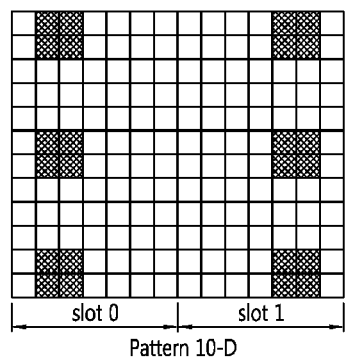
Figure 10:
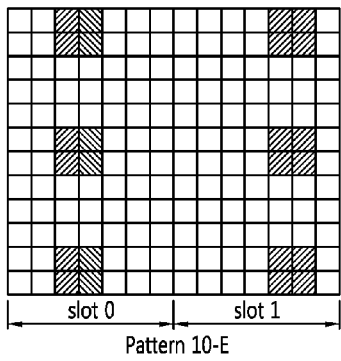
Figure 10:
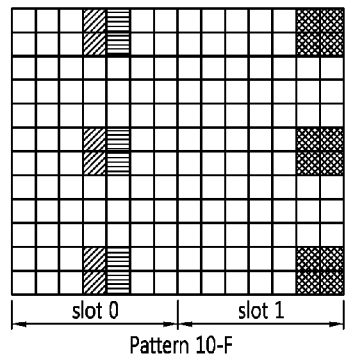
Figure 10:
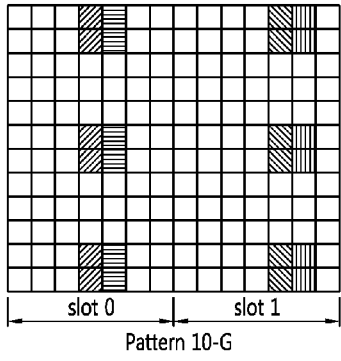

FIG. 10 shows another example to be candidate locations for new DM-RS. Herein, patterns proposed for FDD can be applied to TDD as well as long as it does not collide with PSS/SSS transmitted in TDD.

For example, Pattern 10-A and 10-B are shown that available symbols for new DM-RS are located 1, 2 or 2, 3 OFDM symbols in first slot, and 5, 6 OFDM symbols in second slot. Pattern 10-C and 10-E are shown that available symbols for new DM-RS are located 0, 1 or 1, 2, or 2, 3 OFDM symbols in first slot, and 4, 5 OFDM symbols in second slot. Pattern 10-F and 10-G are shown that available symbols for new DM-RS are located 3, 4 OFDM symbols in first slot, and 5, 6 or 4, 5 OFDM symbols in second slot. Herein, the invention includes that the available symbols can be applied to select for one available symbol for new RS.

FIG. 11 and FIG. 12 show an exemplary candidate location of RS added newly according to an exemplary embodiment of the present invention.

The feasible OFDM symbols for TDD/Normal CP are 0, 4, 5 symbols in each slot to avoid a conflict with CSI-RS. Thus, the followings are feasible locations for DM-RS in TDD/Normal CP at 0, 4 OFDM symbol in each slot, 0, 5 OFDM symbol in each slot, or 4, 5 OFDM symbol. Herein all candidate OFDM symbols may include tracking RS, where the conflict can be avoided by fixing Vshift value for tracking RS such as 0.

Another example is to use for TDD as well FIG. 11. With this DM-RS, still SSS collides with DM-RS in TDD. To resolve this issue, TDD SSS/PSS can be shifted 7th OFDM symbols to the left i.e., SSS/PSSS comes in OFDM symbol 6 in first slot and 2 in second slot (or 5 in first slot and 1 in second slot) respectively. Another resolution to avoid collision with PSS/SSS, for TDD, is to use OFDM symbol 1, 2 (or 2, 3) in first slot and 4, 5 in second slot for DM-RS (instead of 5, 6 in second slot in FDD). Another resolution to avoid collision with PSS/SSS, for TDD, is to use OFDM symbol 5, 6 in first slot and 4, 5 (or 2, 3) in second slot for DM-RS as described 12-A or 12-B as FIG. 12.

FIG. 13 and FIG. 14 show exemplary candidate locations of new RS for FDD/Extended CP according to an exemplary embodiment of the present invention.

Referring to FIG. 13, the candidate locations for FDD/Extended CP are any combinations from OFDM symbol 0, 1, 2, 3. When DM-RS and TRS come in the same OFDM symbol, Vshift for TRS is disabled and fixed to a value such as 0. To utilize for Extended CP, DM-RS may be allocated in OFDM symbol 0, 1 in first slot and second slot each as FIG. 13. Other candidate DM-RS locations may come 2, 3 OFDM symbols in first slot and 4, 5 OFDM symbols in second slot as FIG. 14.

FIG. 15 shows another exemplary candidate location of new RS for TDD/Extended CP according to an exemplary embodiment of the present invention.

Referring to FIG. 15, the candidate locations for new DM-RS would be used OFDM symbol 0, 3, 4 in each slot. Thus, OFDM 0/3, 0/4 or 3/4 can be used for new DM-RS for TDD/Extended CP. When DM-RS and tracking RS coexist in the same OFDM symbol, Vshift for tracking RS will be disabled to avoid the conflict. Another example is to utilize for TDD Extended CP as well. In this case, SSS/PSS may be moved to 5 OFDM symbol in first slot and 2 OFDM symbol in second slot respectively, or 4 OFDM symbol in first slot and 1 OFDM symbol in second slot. In FIG. 15, the locations for the new RS are set to allocate 3, 4 OFDM symbols in first slot and second slot each.

Another approach is to keep the PSS/SSS as it is and puncture the DM-RS REs which collide with SSS. This approach may not be efficient as it requires the shift of DM-RS pattern in special subframes as well. Thus, it is desirable to shift SSS/PSSS location for TDD. Another resolution to avoid collision with PSS/SSS, for TDD, is to use OFDM symbol 1, 2 in first slot and 3, 4 in second slot for DM-RS instead of 4, 5 in second slot in FDD.

Figure 16:
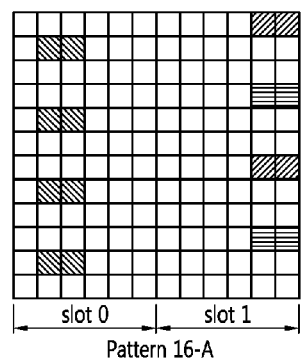
Figure 16:
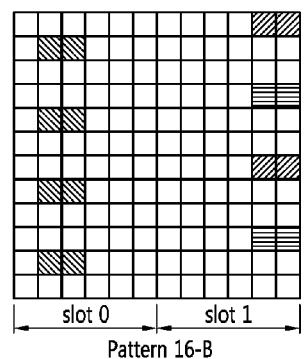
Figure 16:
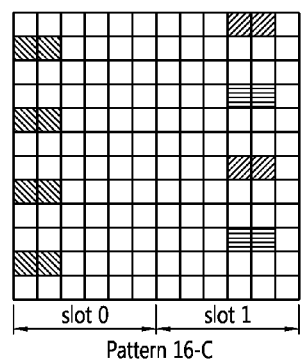
Figure 16:
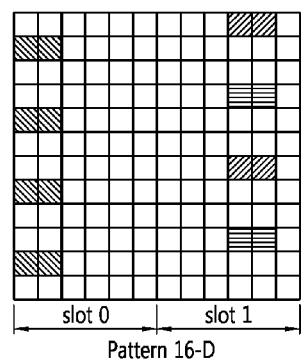
Figure 16:
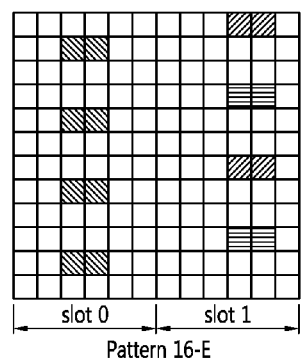
Figure 16:
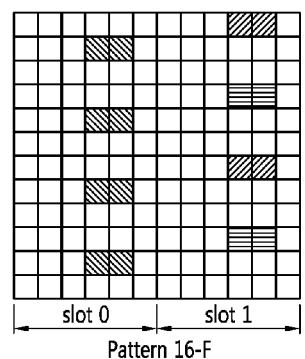
Figure 16:
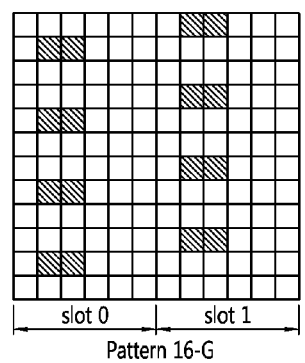
Figure 16:
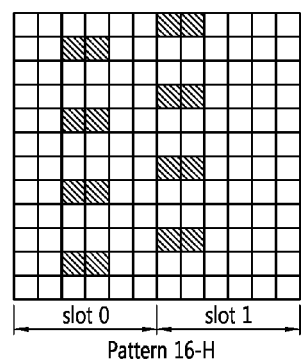

FIG. 16 shows exemplary new RS patterns according to an exemplary embodiment of the present invention. Herein, Extended CP DM-RS patterns are shown.

Referring to FIG. 16, a resolution to avoid collision with PSS/SSS, for TDD, is to use available OFDM symbol 0, 1, 2, 3, in first slot and 5, 6 (or 4, 5) in second slot for new RS. For example, Pattern 16-A and 16-B are shown that available symbols for new RS are located 1, 2 or 2, 3 OFDM symbols in first slot, and 5, 6 OFDM symbols in second slot. Pattern 16-C to 16-F are shown that available symbols for new RS are located 0, 1 or 1, 2, or 2, 3, or 3,4 OFDM symbols in first slot, and 4, 5 OFDM symbols in second slot. Pattern 16-G and 16-H are shown that available symbols for new RS are located 1, 2 or 2, 3 OFDM symbols in first slot, and 1, 2 or 0, 1 OFDM symbols in second slot. Herein, the invention includes that the available symbols can be applied to select for one available symbol for new RS.

Meanwhile, two radio frame structures as Type 1 and Type 2 are supported in this invention. Type 1 is applicable to FDD as shown FIG. 4. Another radio frame structure is called Type 2, applicable to TDD. The supported uplink-downlink configurations are listed in Table 5 where, for each subframe in a radio frame, D denotes the subframe is reserved for downlink transmissions, U denotes the subframe is reserved for uplink transmissions and S denotes a special subframe with the three fields DwPTS, GP and UpPTS. The length of DwPTS and UpPTS is given by Table 4. The table 4 is Configuration of special subframe (lengths of DwPTS/GP/UpPTS) and the table 5 is Uplink-downlink configurations.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

TABLE 4

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

TABLE 5

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 17:
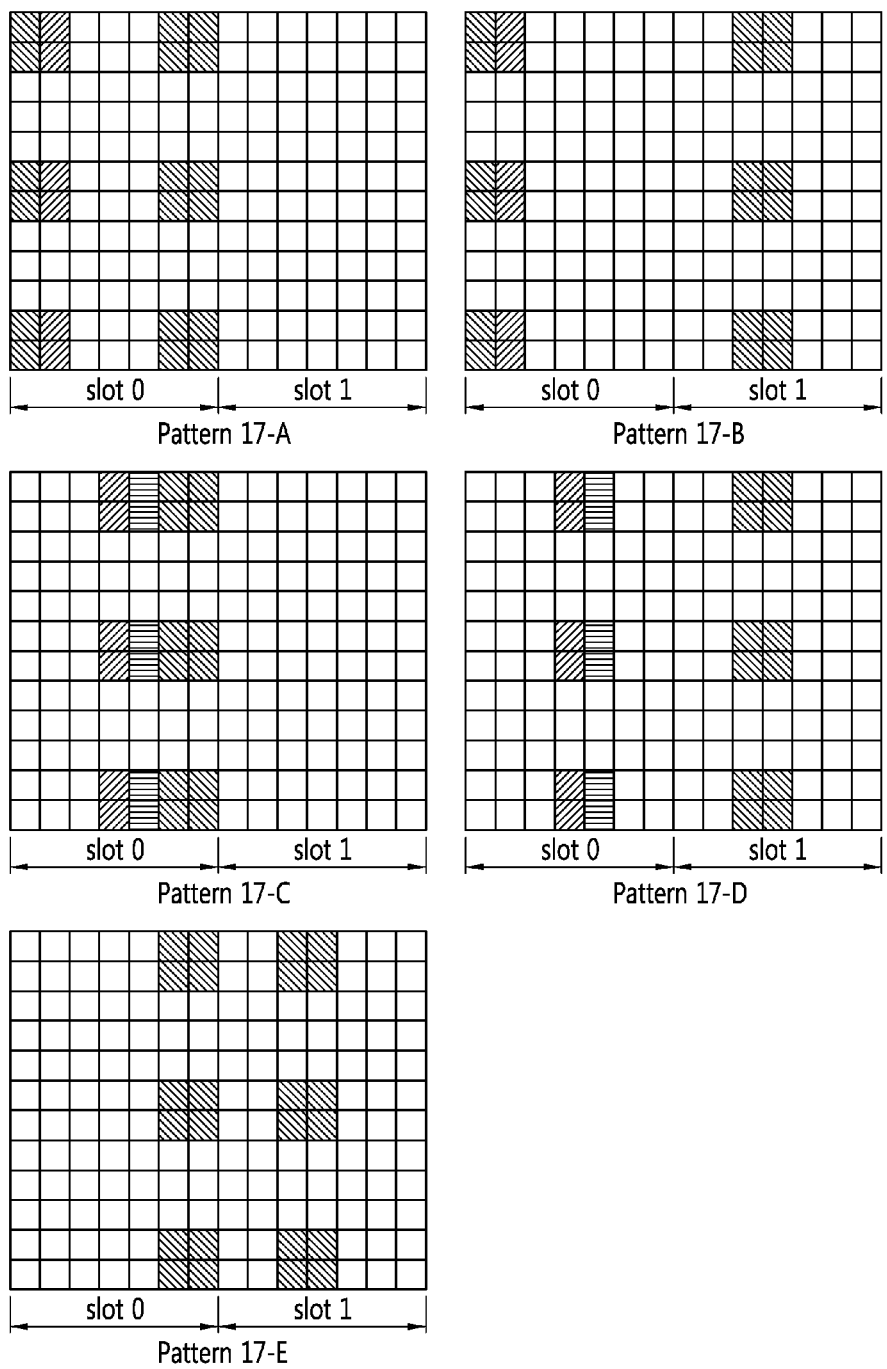
FIG. 17 shows exemplary new RS patterns according to an exemplary embodiment of the present invention.

FIG. 17 shows an exemplary new RS patterns for special subframe according to an exemplary embodiment of the present invention.

Referring to FIG. 17, Pattern 17-A is shown that available symbols for newly added RS (new RS) are located 0, 1 and/or 5, 6 OFDM symbols in first slot in configuration 1 case. Pattern 17-B is shown that available symbols for new RS are located 0, 1 OFDM symbols in first slot and 2, 3 OFDM symbols in second slot in configuration 3 case. Whereas, available symbols for new RS in configuration 1 case are located 3, 4 and/or 5, 6 OFDM symbols in first slot as Pattern 17-C, and the 3, 4 OFDM symbols in first slot and 2, 3 OFDM symbols in second slot are used for configuration 3 case as Pattern 17-D. Further Pattern 17-E is shown that available symbols for new RS are located 5, 6 OFDM symbols in first slot and 2, 3 OFDM symbols in second slot are used for configuration 3 case.

Furthermore, a pattern for new RS in normal CP can include 2, 3 OFDM symbols in first slot and 0, 1 OFDM symbols in second slot and 1, 2 OFDM symbols in first slot and 0, 1 OFDM symbols in second slot for Extended CP. Another pattern may include 0, 4 OFDM symbols in first slot and second slot for RS REs in normal CP and 0, 3 OFDM symbols in first and second slot for Extended CP. Another example for normal CP for RS pattern is OFDM symbol 1, 2 in first slot and {(0,1) or (5, 6)} in second slot where SSS/PSS for TDD can be moved to either OFDM symbol 3, 6 in first slot or 5 ($1^{st}$ slot) and 1 ($2^{nd}$ slot) or 6 ($1^{st}$ slot) and 2 ($2^{nd}$ slot).

As described, a new RS pattern can be one of OFDM symbol [0, 1] in first slot [4, 5] in second slot, OFDM symbol [1, 2] in first slot [4, 5] in second slot, OFDM symbol [2,3] in first slot [4, 5] in second slot in Normal CP/Normal subframe FDD/TDD common. Also, a new RS pattern can be one of OFDM symbol [2, 3] in first slot [5, 6] in second slot or OFDM symbol [1, 2] in first slot and [5, 6] in second slot for FDD case, and OFDM symbol [5, 6] in first slot [2, 3] in second slot or OFDM symbol [2, 3] in first slot [2, 3] in second slot or OFDM symbol [5, 6] in first slot and [4, 5] in second slot for TDD case in Normal CP/Normal Subframe Separate FDD/TDD.

Whereas, a new RS pattern can be one of OFDM symbol [1, 2] in first slot OFDM symbol [1, 2] in second slot for Extended CP FDD/TDD common case, and OFDM symbol [1, 2] in first slot [4, 5] in second slot for FDD case, and OFDM symbol [4, 5] in first slot [1, 2] in second slot or [4, 5] in first slot and [3,4] in second slot for TDD in Extended CP Normal subframe. In Special subframe normal subframe case, a new RS pattern can be one of [0, 1] in first slot with keeping REs in second slot or [3, 4] in first slot with keeping REs in second slot.

Herein, a new RS pattern can be agreed for a normal subframe (may be common between FDD and TDD or separately), it is still needed to discusses how to apply a new RS pattern in different conditions. If a new RS pattern may collide with tracking RS transmitted in new carrier type for time/frequency tracking, either legacy DM-RS pattern is used in subframes with tracking RS or PRBs transmitting TRS or a different DM-RS pattern may be used in subframes with tracking RS or PRBs transmitting TRS. For example, if OFDM symbol [4, 5] in each slot is used for a new RS pattern which may collide with tracking RS, the new RS pattern is used in non-TRS subframes. In TRS subframe, either a legacy DM-RS pattern is used (i.e., OFDM symbol [5, 6] in each slot) or a new pattern such as OFDM symbol [2, 3] in each slot can be used instead. For example, if tracking RS and PSS/SSS are transmitted in different subframes, new RS patterns used in non-TRS subframe and TRS-subframes can be different.

If this newly added RS is used for discovery signals, this can be interpreted as two discovery signal RE patterns can be assumed where one pattern is default (e.g., OFDM symbol [4, 5] in each slot) if CRS is not transmitted in that subframe and the other pattern is used if CRS transmission is occurred. Or, discovery signal with default pattern can be used when the cell is off state whereas the other pattern is used when the cell is on state.

Also, note that in TDD UL/DL configuration 4, 5, and 6, if a new DM-RS pattern introduced for a normal subframe collides with PSS or other synchronization signal, a legacy pattern in normal subframe or a new DM-RS pattern design for special subframe configuration 8 may be used for the subframe number 6 downlink normal subframe. In Extended CP, a legacy DM-RS pattern for a normal subframe can be used for the same case. Also, note that if a new DM-RS pattern collides with tracking RS, DM-RS may be punctured.

This invention includes a new RS configuration, For example, a CSI-RS Resource Configuration with a new DM-RS is following. When a new DM-RS pattern is used which may use different OFDM symbol locations from legacy DM-RS pattern with antenna port 7-14, some considerations on CSI-RS configuration is necessary. To minimize the impact, a new CSI-RS pattern may be determined in tied with DM-RS RE location. For example, if a new DM-RS RE is present in either OFDM symbol 2 or 3 in a slot, the CSI-RS configuration with l=2 or l=5 are changed to l=5 or l=2 respectively. For example, if a new DM-RS is present in OFDM symbol 2 and 3 in the first slot, the new CSI-RS pattern that UE may assume is as following Table 6.

TABLE 6

| | | Number of CSI reference signals configured | | | | | |
|---|---|---|---|---|---|---|---|
| CSI reference signal | | 1 or 2 | | 4 | | 8 | |
| configuration | | (k', l') | $n_s$ mod 2 | (k', l') | $n_s$ mod 2 | (k', l') | $n_s$ mod 2 |
| Frame structure type 1 and 2 | 0 | (9, 2) | 0 | (9, 2) | 0 | (9, 2) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 2) | 0 | (8, 2) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 2) | 0 | | | | |
| | 11 | (2, 2) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 0) | 1 | | | | |
| | 29 | (2, 1) | 1 | | | | |
| | 30 | (1, 1) | 1 | | | | |
| | 31 | (0, 1) | 1 | | | | |

Another example is when DM-RS is present in OFDM symbol 2 and 3 in both slots, the CSI-RS configuration that UE may assume is as following Table 7

TABLE 7

| | | Number of CSI reference signals configured | | | | | |
|---|---|---|---|---|---|---|---|
| CSI reference signal | | 1 or 2 | | 4 | | 8 | |
| configuration | | (k', l') | $n_s$ mod 2 | (k', l') | $n_s$ mod 2 | (k', l') | $n_s$ mod 2 |
| Frame structure type 1 and 2 | 0 | (9, 2) | 0 | (9, 2) | 0 | (9, 2) | 0 |
| | 1 | (11, 5) | 1 | (11, 5) | 1 | (11, 5) | 1 |
| | 2 | (9, 5) | 1 | (9, 5) | 1 | (9, 5) | 1 |
| | 3 | (7, 5) | 1 | (7, 5) | 1 | (7, 5) | 1 |
| | 4 | (9, 2) | 1 | (9, 2) | 1 | (9, 2) | 1 |
| | 5 | (8, 2) | 0 | (8, 2) | 0 | | |

TABLE 7-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| | 6 | (10, 5) | 1 | (10, 5) | 1 | | |
| | 7 | (8, 5) | 1 | (8, 5) | 1 | | |
| | 8 | (6, 5) | 1 | (6, 5) | 1 | | |
| | 9 | (8, 2) | 1 | (8, 2) | 1 | | |
| | 10 | (3, 2) | 0 | | | | |
| | 11 | (2, 2) | 0 | | | | |
| | 12 | (5, 5) | 1 | | | | |
| | 13 | (4, 5) | 1 | | | | |
| | 14 | (3, 5) | 1 | | | | |
| | 15 | (2, 5) | 1 | | | | |
| | 16 | (1, 5) | 1 | | | | |
| | 17 | (0, 5) | 1 | | | | |
| | 18 | (3, 2) | 1 | | | | |
| | 19 | (2, 2) | 1 | | | | |
| Frame structure | 20 | (11, 1) | 1 | (11, 1) | 1 | (11, 1) | 1 |
| type 2 on | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

When a UE is configured with TM9 or TM10 with single CSI process, In terms of configuring ZP CSI-RS and CSI-RS, UE based on used DM-RS, may decide implicitly which table to use for CSI-RS resource. Or, explicit higher layer signaling can be given to a UE to use which table for CSI-RS resource used. Or, the table is determined based on the cell type from which CSI-RS and/or DM-RS is transmitted. For example, if the serving cell type is new carrier type, UE may assume that the new table (assuming a new DM-RS pattern is used) for CSI-RS configuration is used. Alternatively, for IMR and/or zero-power CSI-RS process, a UE may assume that Rel-11 CSI-RS pattern is used.

When a UE is configured with TM10 with multiple CSI process, non-zero-power CSI-RS configuration is determined per CSI process, based on the rules mentioned in above. For zero-power CSI-RS configuration, there are two ways, firstly, legacy CSI-RS pattern (Rel-11) CSI-RS pattern is assumed for zero-power CSI-RS. Whereas, if CSI-RS configurations are for new carrier types only (i.e., al CSI-RS is associated with a new DM-RS pattern), zero-power CSI-RS follows the new CSI-RS pattern secondly. Otherwise, legacy CSI-RS (Rel-11) CSI-RS pattern is assumed. For Interference Measurement Resource follow zero-power CSI-RS configuration in table 7.

In this invention, a UE may assume that the same CSI-RS resource is used to legacy CSI-RS configuration once a CSI-RS configuration is configured for the new RS alternatively. When a new DM-RS RE and the configured CSI-RS configuration collide in any RE, UE may assume that DM-RS is punctured and CSI-RS is transmitted. Otherwise, UE may assume that CSI-RS is punctured and DM-RS is transmitted. Alternatively, a new DM-RS pattern may be used only when PSS/SSS is transmitted. If a CSI-RS configuration is configured in subframes where PSS/SSS is transmitted, a UE may assume that a new CSI-RS table is applied in that subframe. For example, if CSI-RS configuration 0 is configured to a UE (k', l')=(9, 5) in slot 0 and it collides with PSS/SSS and a UE is configured with a new DM-RS pattern which does not colliding with PSS/SSS, then UE may assume that CSI-RS in that subframe will be transmitted in (k', l')=(9, 2) instead. Also the invention can include that UE assumes keeping a legacy CSI-RS configuration in this case. When a new DM-RS pattern is transmitted in OFDM symbol 2 and/or 3, CSI-RS configuration with l'=2 may be replaced with l'=5 to avoid collision between CSI-RS and DM-RS.

Alternatively, it is also considerable to add a constraint that a UE shall assume that IMR is not configured in subframe carrying PSS/SSS and/or tracking or cell-specific RS. More specifically, this constraint is may be limited only to the case with the number of CSI process is larger than 1.

If this constraint is added, two different DM-RS patterns may be used in subframes carrying PSS/SSS or other subframes. For example, for subframes carrying PSS/SSS, OFDM symbol [2, 3] in each slot can be used for a DM-RS pattern. And, other subframes may use [5, 6] in each slot or [4, 5] in each slot or [0, 1] in each slot in normal subframe case. The purpose of having two separate DM-RS pattern is to avoid collision between DM-RS pattern and CSI-RS and/or IMR configurations.

Additionally, if a new DM-RS pattern may collide with CSI-RS configurations, a new DM-RS pattern may be transmitted in subframes or PRBs which do not carry CSI-RS. In CSI-RS subframes, a legacy DM-RS pattern (Rel-11 DM-RS pattern) or a different new pattern may be assumed. Note that CSI-RS configuration include either zero-power CSI-RS configuration or non-zero-power CSI-RS configuration or Interference Measurement Resource configuration. More specifically, if a CSI-RS configuration colliding with a new DM-RS pattern collides with PSS/SSS and thus is not transmitted in that subframe and thus not colliding with the new DM-RS REs, then new DM-RS pattern can be used even though CSI-RS configuration collides with DM-RS In other words, decision to roll-back to a legacy DM-RS pattern or a different DM-RS pattern is based on an occurred collision instead of collision from configuration.

Hereinafter, in the wireless communication system according to the present invention, new DM-RS Pattern for TDD Normal Subframe carrying PSS will be described.

In TDD UL/DL configurations such as Configuration 3, 4, or 5, a normal subframe may carry PSS in $6^{th}$ subframe in every radio frame. If a new DM-RS pattern used for TDD normal subframe carries DM-RS in OFDM symbol 2 in first slot where PSS is carried in both normal and Extended CP, the pattern will collide with PSS. A few approaches are feasible to address this issue. A UE may assume that the DM-RS pattern used for TDD normal subframe which carries PSS is same as the DM-RS pattern used in special subframe configuration 3, 4 or 8 in normal CP and special subframe 1, 2, 3, 5, 6 in Extended CP. Or a UE may assume that the TDD normal subframe which carries PSS is the same as special subframe configuration 4 in normal CP and 3 in Extended CP except that UpPTS is not used for uplink transmission. Furthermore, DM-RS is punctured when the new pattern DM-RS and PSS collide.

In addition, the invention includes that Power Boosting in Tracking RS when Tracking RS and DM-RS may collide. If a new DM-RS pattern used for normal subframe (and/or special subframe if special subframe may carry tracking RS) collides with the tracking RS pattern (e.g., DM-RS can be present in OFDM symbol 0, 4 in each slot in normal CP), power boosting on tracking RS may be limited. Firstly, Power boosting on tracking RS is disabled. Secondly, if power boosting on tracking RS is used. The power of DM-RS is kept the same. Boosted power is taken from only PDSCH REs in the same OFDM symbol. In this case, the DM-RS-to-PDSCH ratio can be given to a UE with [+3, 0, −3] values. More specifically, DM-RS-to-PDSCH ratio without tracking RS and with tracking RS can be different. So, two ratio with/without tracking RS present in the same OFDM symbol can be higher layer signaled to a UE. Thirdly, if power boosting on tracking RS is used. The boosted power is taken from both DM-RS and PDSCH with keeping the DM-RS-to-PDSCH ratio same. In this case, additional signaling is not needed.

The invention can apply different DM-RS Pattern in each subframe. When a new DM-RS pattern is introduced in addition to a legacy DM-RS pattern or more than one new DM-RS Patterns are introduced, herein the DM-RS Pattern 1 and DM-RS Pattern 2 for candidate two DM-RS patterns (e.g., Pattern 1=Rel-11 DM-RS pattern, Pattern 2=OFDM symbol 2, 3 in each slot) are defined. In terms of utilizing two or more different DM-RS patterns in FDD, multiple options are possible. This invention can use one of 1) two different DM-RS patterns in TRS subframe and non-TRS subframe (TRS=tracking RS), 2) two different DM-RS patterns in CSI-RS subframe and non-CSI-RS subframe (CSI-RS subframe indicates subframe carrying CSI-RS including both non-zero and zero power CSI-RS), 3) two different DM-RS patterns in PSS/SSS subframe and non PSS/SSS subframe, 4) three different DM-RS patterns in TRS/PSS/SSS/CSI-RS subframe, TRS/PSS/SSS subframe, 5) three different DM-RS patterns in PSS/SSS/CSI-RS/TRS subframe, PSS/SSS/CSI-RS subframe.

The two or more different DM-RS patterns in TDD in this invention can be extended by multiple options as bellows, 1) two different DM-RS patterns in TRS subframe and non-TRS subframe (TRS=tracking RS), 2) two different DM-RS patterns in CSI-RS subframe and non-CSI-RS subframe (CSI-RS subframe indicates subframe carrying CSI-RS including both non-zero and zero power CSI-RS), 3) two different DM-RS patterns in SSS ubframe and non SSS subframe (SSS subframe indicates subframe carrying SSS), 4) three different DM-RS patterns in TRS/SSS/CSI-RS subframe, TRS/SSS subframe, 5) three different DM-RS patterns in SSS/CSI-RS/TRS subframe, SSS/CSI-RS subframe, 6) three different DM-RS patterns in TRS/PSS/CSI-RS subframe, TRS/PSS subframe, 7) three different DM-RS patterns in PSS/CSI-RS/TRS subframe, PSS/CSI-RS subframe, 8) three different DM-RS patterns in SSS/TRS subframe, other normal subframe, special subframe, 9) two different DM-RS patterns in #1/#6 with special subframes and other subframes, 10 three different DM-RS patterns in #1/#6 with special subframes, TRS subframe, 11) four different DM-RS patterns in TRS subframe, PSS subframe, CSI-RS subframe, other normal subframe, 12) four different DM-RS patterns in TRS subframe, special subframes, CSI-RS subframe, other normal subframe, 13) five different DM-RS patterns in TRS subframe, SSS subframe, special subframes, CSI-RS subframe, other normal subframe, 14) five different DM-RS patterns in TRS subframe, SSS subframe, PSS subframes, CSI-RS subframe, other normal subframe.

Figure 18:
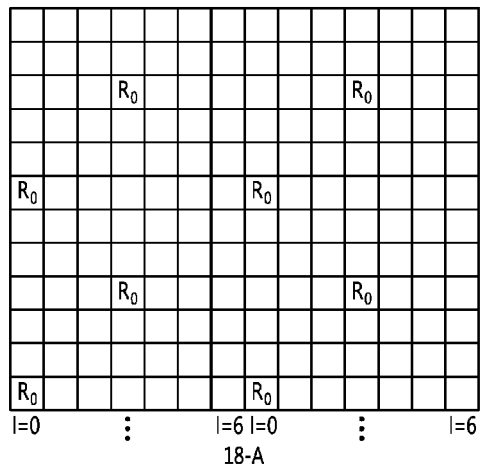
FIG. 18 shows exemplary CRS patterns according to an exemplary embodiment of the present invention.

Furthermore, this invention shows RS signal handling with changed DM-RS location as FIG. 18. The FIG. 18 shows an exemplary CRS patterns according to an exemplary embodiment of the present invention.

Referring to FIG. 18, the new DM-RS can be 1, 2/4, 5 OFDM symbols in first slot and second slot when the new DM-RS may collide with CRS if Vshift is use, here the Vshift for the CRS should not be used and the location of CRS should be changed to 0, 3/0, 3 OFDM symbols as 18-A. The TDD configuration also is applied to avoid that PSS may be collided at $6^{th}$ subframe. The new DM-RS can be used 2, 3/4, 5 OFDM symbols in first slot and second slot to disable Vshift for the CRS and change to 0, 4/0, 3 OFDM symbols for the CRS as 18-B. Available resource for the new DM-RS can be used 0, 1/4, 5 OFDM symbols in first slot and second slot to disable Vshift for the CRS and change to 2, 4/0, 3 OFDM symbols for the CRS as 18-C or used 0, 1/0, 1 OFDM symbols in first slot and second slot to disable Vshift for the CRS and change to 2, 4/2, 4 (or 1, 4/1, 4) OFDM symbols for the CRS as 18-D. Further, the new DM-RS can be used 0, 1/5, 6 OFDM symbols in first slot and second slot to disable Vshift for the CRS and change to 2, 4/0, 4 OFDM symbols for the CRS as 18-E.

Figure 19:
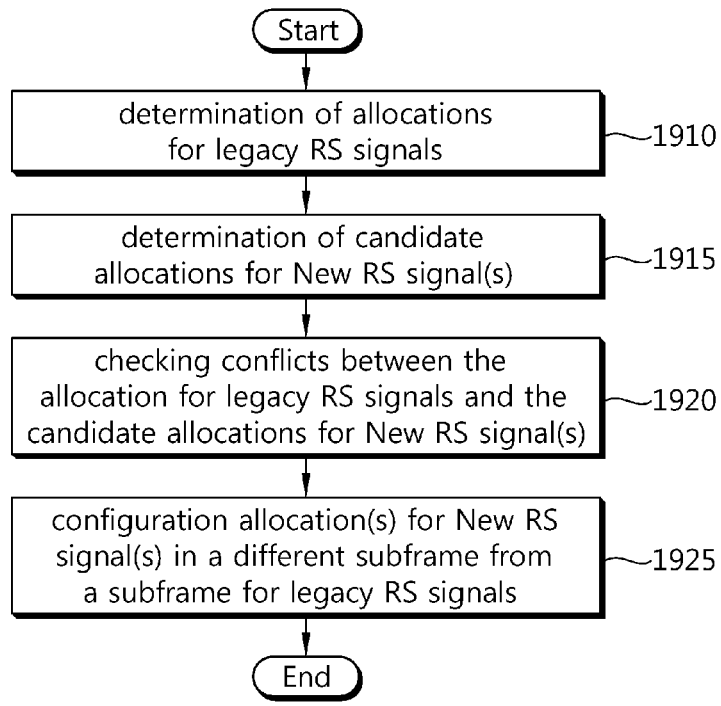
FIG. 19 shows an exemplary flow chart for allocating new RS with legacy RSs according to an exemplary embodiment of the present invention.

FIG. 19 shows an exemplary flow chart for allocating new RS with legacy RSs according to an exemplary embodiment of the present invention.

Referring to FIG. 19, the process begins by determining whether to generate new RS subframe. The determination may be made by a base station in determining to use a new extension carrier or performed dynamically based on signal conditions. For example, in step 1910, the process may determine whether the legacy RSs is absent in one or more downlink subframes and determine to generate the new RS subframe to include in the one or more downlink subframes. Herein the process may determine that locations for a new RS in different subframes from subframes for legacy RSs. For example, the process may determine whether a time density and/or a frequency density of the CSI-RS for time and/or frequency tracking RS. Herein the process can also consider a presence of PSS/SSS. The process may include the new RS in the downlink subframe on a port for a UE-specific reference signal (DM-RS as example).

Then, the process determines candidate allocations for the new RS based on the resources for legacy RS in the subframe in step 1915.

The process determines and checks conflicts between the allocation for legacy RS signals and the candidate allocations for New RS signal(s), herein the process can check to find available allocations optimized for New RS by changing a fixed V shift with a specific value corresponding to a specific RS signal or being able/disable shift value or changing OFDM symbols to shift with specific value or patterns in step 1920.

The process can apply new/updated/same configuration with different RS configuration objects to configure the available allocations for New RS to be selected in step 1925. In another example, the process may configure the new RS in the downlink subframe independently of a CSI-RS configuration included in the downlink subframe. A pattern of the new RS in the CRI-RS subframe may be the same as that of a CSI-RS port with increased frequency density and regular spacing between resource elements of the new RS in the subframe. In other examples, the pattern of the new RS in the subframe may be a collection of multiple patterns as shown FIGS. 8 to 19.

Although the present disclosure has been described with an exemplary embodiment, various changes and modifications may be suggested to one skilled in the art. It is intended that the present disclosure encompass such changes and modifications as fall within the scope of the appended claims.

Figure 20:
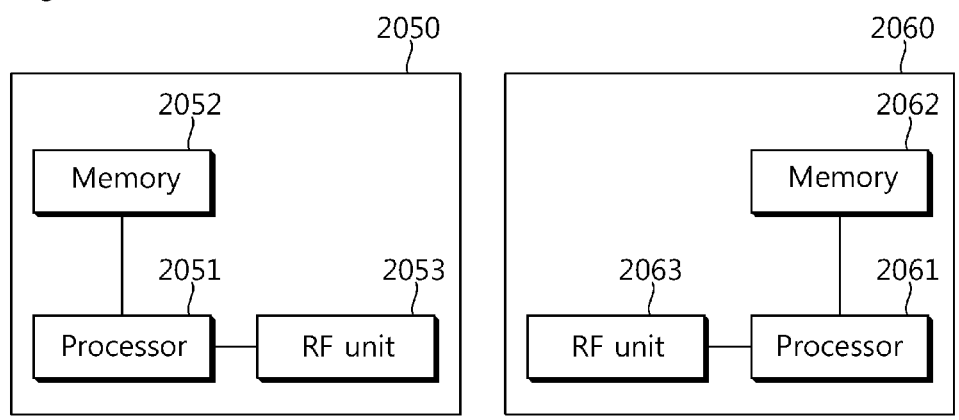
FIG. 20 shows a block diagram showing a wireless communication system according to an exemplary embodiment of the present invention.

FIG. 20 is a block diagram showing a wireless communication system according to an embodiment of the present invention.

A BS 2050 includes a processor 2051, a memory 2052, and a radio frequency (RF) unit 2053. The memory 2052 is coupled to the processor 2051, and stores a variety of information for driving the processor 2051. The RF unit 2053 is coupled to the processor 2051, and transmits and/or receives a radio signal. The processor 2051 implements the proposed functions, procedures, and/or methods. In the embodiments of FIG. 2 to FIG. 10, the operation of the BS can be implemented by the processor 2051.

Especially, the processor 2051 may configure multiple CCs with different carriers and measurement objects for inter-frequency measurement and RLF. The processor 2051 determines optimized locations for a new RS in different subframes from subframes for legacy RSs by checking conflicts between the allocation for legacy RS signals and the available allocations for New RS, herein the process can check and set to change a fixed V shift with a specific value corresponding to a specific RS signal, be able/disable the shift value. Also the process can change OFDM symbols to shift with specific value or patterns to different symbols according to applying Normal/Extended CP length and/ different TDD configuration for special subframe, and TDD/FDD scheme applied.

Whereas, a wireless device 2060 includes a processor 2061, a memory 2062, and an RF unit 2063. The memory 2062 is coupled to the processor 2061, and stores a variety of information for driving the processor 2061. The RF unit 2063 is coupled to the processor 2061, and transmits and/or receives a radio signal. The processor 2061 implements the proposed functions, procedures, and/or methods. In the embodiments of the FIG. 2 to FIG. 10, the operation of the UE can be implemented by the processor 2061.

Especially, the processor 2061 may configure multiple CCs with different carriers and measurement objects for inter-frequency measurement and RLF. The processor 2061 determines optimized locations for a new RS in different subframes from subframes for legacy RSs by checking conflicts between the allocation for legacy RS signals and the available allocations for New RS, herein the process can check and set to change a fixed V shift with a specific value corresponding to a specific RS signal, be able/disable the shift value. Also the process can change OFDM symbols to shift with specific value or patterns to different symbols according to applying Normal/Extended CP length and/ different TDD configuration for special subframe, and TDD/FDD scheme applied. Therefore, the UE can have new RS information with new/updated/same configuration having different RS configuration objects to configure the New RS and obtains the new RS signal to reduce the inter-cell interference and legacy RSs.

Furthermore, the processor 2061 may configure to receive a new RS subframe at a periodicity among other subframes not including the new RS, identify the new RS in the subframe which is a different subframe from the other subframes for legacy RS signals, and perform at least one of frequency or timing tracking, cell identification, and measurement using the new RS, wherein a frequency density of the new RS in the subframe is located with at least 3 resource element each other. That the processor 2061 can determine whether the legacy RS signals each is absent in one or more downlink subframes, and identify candidate allocations with orthogonal frequency division multiplexing (OFDM) symbols or sub-carriers for the new RS not to collide with the legacy RS signals which are allocated in the one or more downlink subframes. Herein the processor 2061 can determin the new RS in the subframe which is variable set by checking one of conflicts between a Channel State information (CSI)-RS, a tracking reference signal (TRS), a primary synchronization signal(PSS) and a secondary synchronization signal(SSS), and a cell specific reference signal (CRS) and the new RS. The newly added RS can be used for discovery signals and called different name for the same meaning.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for configuring a reference signal (RS) in a wireless communication system supporting multiple carriers, the method being performed by a wireless device and comprising:
   determining, by a processor of the wireless device, whether to configure a new RS,
   wherein the new RS is determined to be configured if one or more legacy RSs are absent in one or more downlink subframes received by a radio frequency receiver of the wireless device;
   configuring, by the processor, the new RS within the one or more received downlink subframes;
   determining, by the processor, a candidate location of the new RS within the one or more configured downlink subframes by considering at least one of a time/frequency density of the new RS, a time/frequency tracking of the new RS, a cell identification of the new RS, a presence of a primary synchronization signal (PSS)/secondary synchronization signal (SSS) and a measurement using the new RS; and
   changing, by the processor, the candidate location of the new RS by shifting orthogonal frequency divisional multiplexing (OFDM) symbols or sub-carriers such that the candidate location of the new RS does not collide with the one or more legacy RSs within the one or more configured downlink subframes.

2. The method of claim 1, wherein the candidate location of the new RS is located at one of 0/1 OFDM symbols, 0/4 OFDM symbols, and 1/4 OFDM symbols in each slot.

3. The method of claim 1, wherein the candidate location of the new RS is set by checking a conflict between a tracking reference signal (TRS) and the new RS, and
   wherein a periodicity of the TRS subframe is at least one of one TRS subframe every five milliseconds or one TRS subframe in every five subframes and a Vshift of the TRS is set to a fixed value as 2 in a Normal cyclic prefix (CP) or 0 in an Extended CP.

4. The method of claim 1, wherein the candidate location of the new RS is set by checking a conflict between the PSS/SSS and the new RS, and
   wherein the PSS/SSS are set at 5th, 6th OFDM symbols in corresponding slots.

5. The method of claim 1, wherein the candidate location of the new RS is set by checking a conflict between a cell specific reference signal (CRS) and the new RS, and
   wherein the CRS is transmitted in a subframe carrying a Physical Downlink Control Channel (PDCCH).

6. The method of claim 1, wherein the candidate location of the new RS is set by applying a Time Division Duplex (TDD) or a Frequency Division Duplex (FDD) configuration.

7. The method of claim 1, wherein the candidate location of the new RS is set by applying a Normal cyclic prefix (CP) or an Extended CP.

8. A wireless device for configuring a reference signal (RS) in a wireless communication system supporting multiple carriers, the wireless device comprising:
   a radio frequency receiver configured to receive a radio signal; and
   a processor, operatively coupled with the radio frequency receiver, and configured to:
      determine whether to configure a new RS,
      wherein the new RS is determined to be configured if one or more legacy RSs are absent in one or more downlink subframes received by the radio frequency receiver,
      configure the new RS within the one or more received downlink subframes,
      determine a candidate location of the new RS within the one or more configured downlink subframes by considering at least one of time/frequency density of the new RS, a time/frequency tracking of the new RS, a cell identification of the new RS, a presence of a primary synchronization signal (PSS)/secondary synchronization signal (SSS) and a measurement using the new RS, and
      change the candidate location of the new RS by shifting orthogonal frequency divisional multiplexing (OFDM) symbols or sub-carriers such that the candidate location of the new RS does not collide with the one or more legacy RSs within the one or more configured downlink subframes.

9. The wireless device of claim 8, wherein the candidate location of the new RS is set by checking a conflict between a tracking reference signal (TRS) and the new RS.

10. The wireless device of claim 8, wherein the candidate location of the new RS is set by checking a conflict between the PSS/SSS and the new RS.

11. The wireless device of claim 8, wherein the candidate location of the new RS is set by checking a conflict between a cell specific reference signal (CRS) and the new RS, and
   wherein the CRS is transmitted in a subframe carrying a Physical Downlink Control Channel (PDCCH).

* * * * *